United States Patent [19]

Nusbaum

[11] Patent Number: 5,702,072
[45] Date of Patent: Dec. 30, 1997

[54] AILERON/FLAP MIXING MECHANISM

[76] Inventor: Steve R. Nusbaum, 10419 VanderKarr Rd., Hebron, Ill. 60034

[21] Appl. No.: 497,103

[22] Filed: Jun. 30, 1995

[51] Int. Cl.⁶ .................................................. B64C 13/04
[52] U.S. Cl. .................................. 244/225; 244/75 R
[58] Field of Search ............................ 244/225, 213, 244/214, 215, 75 R, 90 R

[56] References Cited

U.S. PATENT DOCUMENTS

| 1,989,358 | 1/1935 | Guthier | 244/225 |
|---|---|---|---|
| 2,254,304 | 9/1941 | Miller. | |
| 2,422,035 | 6/1947 | Noyes. | |
| 2,478,033 | 8/1949 | Weick | 244/225 |
| 2,612,329 | 9/1952 | Crandall et al. | |
| 2,675,679 | 4/1954 | Parker | 244/225 |
| 2,677,512 | 5/1954 | Kirkbridge et al. | |
| 2,699,687 | 1/1955 | Crandall. | |
| 2,712,420 | 7/1955 | Amster et al. | 244/225 |
| 2,957,656 | 10/1960 | Lewis et al. | 244/225 |
| 3,155,346 | 11/1964 | Charlton et al. | |
| 3,659,810 | 5/1972 | Robertson | 244/225 |
| 3,754,727 | 8/1973 | Donovan. | |
| 4,154,415 | 5/1979 | Harris et al. | 244/225 |
| 4,717,097 | 1/1988 | Sepstrup. | |

*Primary Examiner*—Galen L. Barefoot
*Attorney, Agent, or Firm*—Leydig, Voit & Mayer, Ltd

[57] ABSTRACT

A short take off and landing (STOL) aircraft is optimized for STOL performance and flight at minimum airspeed. The aircraft includes leading edge wing slats that are extended and retracted under the direct manual control of the pilot. The aircraft further includes an aileron/flap mixing mechanism that automatically droops the ailerons when the flaps are lowered. A flap bellcrank, which pivots to lower the flaps, carries a pair of pulleys. Aileron control cables, that actuate an aileron bellcrank to raise and lower an aileron, are threaded around and between the two pulleys. When the flap bellcrank pivots to lower the flap, the pulleys vary the positions of the aileron control cables relative to each other to pivot the aileron bellcrank and thereby lower the aileron. The aileron control cables remain independently movable to maintain pilot control over the bank and roll of the aircraft. Preferably, the ailerons and flaps are drooped at different rates so that the aileron droop angle is approximately one-half of the flap angle. Preferably, lost most is provided so that aileron droop is minimized at small flap angles.

14 Claims, 4 Drawing Sheets

5,702,072

AILERON/FLAP MIXING MECHANISM

RELATED APPLICATION

Reference is made to the co-pending application of Steve R. Nusbaum entitled "STOL Aircraft and Wing Slat Actuating Mechanism for Same" filed concurrently herewith, the specification of which is incorporated by reference herein.

BACKGROUND OF THE INVENTION

This invention relates generally to fixed wing aircraft and, more particularly, to mechanisms for actuating wing flaps and ailerons in such aircraft.

Wing flaps and ailerons are well-known structures in fixed wing aircraft. Although flaps and ailerons are both similarly situated along the trailing edge of a wing, flaps and ailerons perform essentially different functions. Ailerons function primarily to control roll and bank and move in opposite directions under the pilot's control. Flaps on the other hand move in unison and function, when lowered, to increase wing lift and induce drag. The increased lift, in turn, permits reduced landing speeds and increases the angle of ascent and descent to improve the aircraft's short take off and landing (STOL) performance. Ailerons can move either upwardly or downwardly relative to the wing chord. Flaps, on the other hand, cannot. They move only between positions at or below the chord. Because flaps increase drag when they are deployed, they are generally retracted during normal cruising flight when additional wing lift is neither needed nor desired. the wing chord. To provide adequate roll and bank control and maintain stability, however, particularly at low airspeeds, ailerons also need to have a certain minimum size. Because the size of the wing trailing edge is finite, a trade off exists between flap size and aileron size. To the extent space along the trailing edge is devoted to ailerons, less space is available for flaps and vice versa. STOL performance of an aircraft can be improved by utilizing the space available along the trailing edge of a wing to maximum advantage.

In one known arrangement, separate flaps and ailerons were replaced by a single control surface or "flaperon" mounted along the trailing edge of each wing. The "flaperons" were movable in opposite directions to provide roll and bank control as with ordinary ailerons. In addition, the flaperons could be simultaneously and coordinately lowered relative to the wing chord to function as wing flaps as well. However, in order to provide adequate roll and bank control, and to avoid stalling the wings near the tips, the flaperons could not be lowered more than about 20 degrees relative to the wing chord. This largely negated the benefit of having a control surface along substantially the entire trailing edge of the wing available to function as a flap.

In another approach, a flap surface was incorporated into an aileron. In other words, the flap was hinged to the aileron which, in turn, was hinged to the wing trailing edge.

Various forms of aileron and flap control mechanisms are shown in the following U.S. patents:

| Patent No. | Inventor(s) | Issue Date |
|---|---|---|
| 4,717,097 | Sepstrup | 01/05/88 |
| 3,754,727 | Donovan | 08/28/73 |
| 3,155,346 | Charlton, et al. | 11/03/64 |
| 2,699,687 | Crandall | 01/18/55 |
| 2,677,512 | Kirkbridge, et al. | 05/04/54 |
| 2,612,329 | Crandall, et al. | 09/30/52 |
| 2,422,035 | Noyes | 06/10/47 |
| 2,254,304 | Miller | 09/02/41 |

SUMMARY OF THE INVENTION

The invention provides a system for drooping the ailerons of an aircraft when the flaps of the aircraft are lowered. The system includes a pilot actuated flap control for lowering the flaps of the aircraft and a pilot actuated aileron control for varying the positions of the ailerons to control the roll and bank of the aircraft. The system further includes a mixing interface operative between the flap control and the aileron control to simultaneously droop the ailerons of the aircraft in response to lowering of the flaps while permitting the aileron control to vary the positions of the ailerons relative to each other thereby to maintain pilot control over aircraft bank and roll.

The invention also provides a system for drooping the ailerons of an aircraft when the flaps of the aircraft are lowered. The system includes an aileron bellcrank coupled to one of the ailerons and operable to lower the aileron in response to rotation of the aileron bellcrank in a first direction and to raise the aileron in response to rotation of the aileron bellcrank in a second direction. The system further includes a pair of aileron control cables coupled to the aileron bellcrank for rotating the aileron bellcrank to raise and lower the aileron. A flap bellcrank, coupled to one of the flaps, is operable to lower the flap in response to rotation of the flap bellcrank from a predefined initial position and to raise the flap in response to rotation of the flap bellcrank back to the initial position. A control link, coupled to the flap bellcrank, is provided for rotating the flap bellcrank to raise and lower the flap. A mixing control interface, coupled to the flap bellcrank and engaging the aileron control cables, is provided for varying the position of the aileron control cables relative to each other in response to rotation of the flap bellcrank from the initial position to rotate the aileron bellcrank in the first direction when the flap bellcrank is rotated from the initial position so that the aileron is drooped when the flap is lowered and so that the aileron control cables remain operative to raise and lower the aileron even though the aileron is drooped.

It is an object of the present invention to provide a new and improved mechanism for actuating and controlling the wing flaps and ailerons of a fixed wing aircraft.

It is a further object of the present invention to provide a new and improved mechanism for controlling the ailerons and flaps of a fixed wing aircraft so as to improve the STOL performance of the aircraft.

It is a further object of the present invention to provide a mechanism for controlling the flaps and ailerons of an aircraft so as to droop the ailerons of the aircraft when the flaps are lowered.

It is a further object of the present invention to provide an aileron/flap mixing mechanism that automatically droops the ailerons when the flaps are lowered while simultaneously maintaining pilot control over the ailerons in order to maintain pilot control of the aircraft.

It is a further object of the present invention to provide an aileron/flap mixing mechanism that is reliable and effective in operation and that is simple and economical in manufacture and maintenance.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
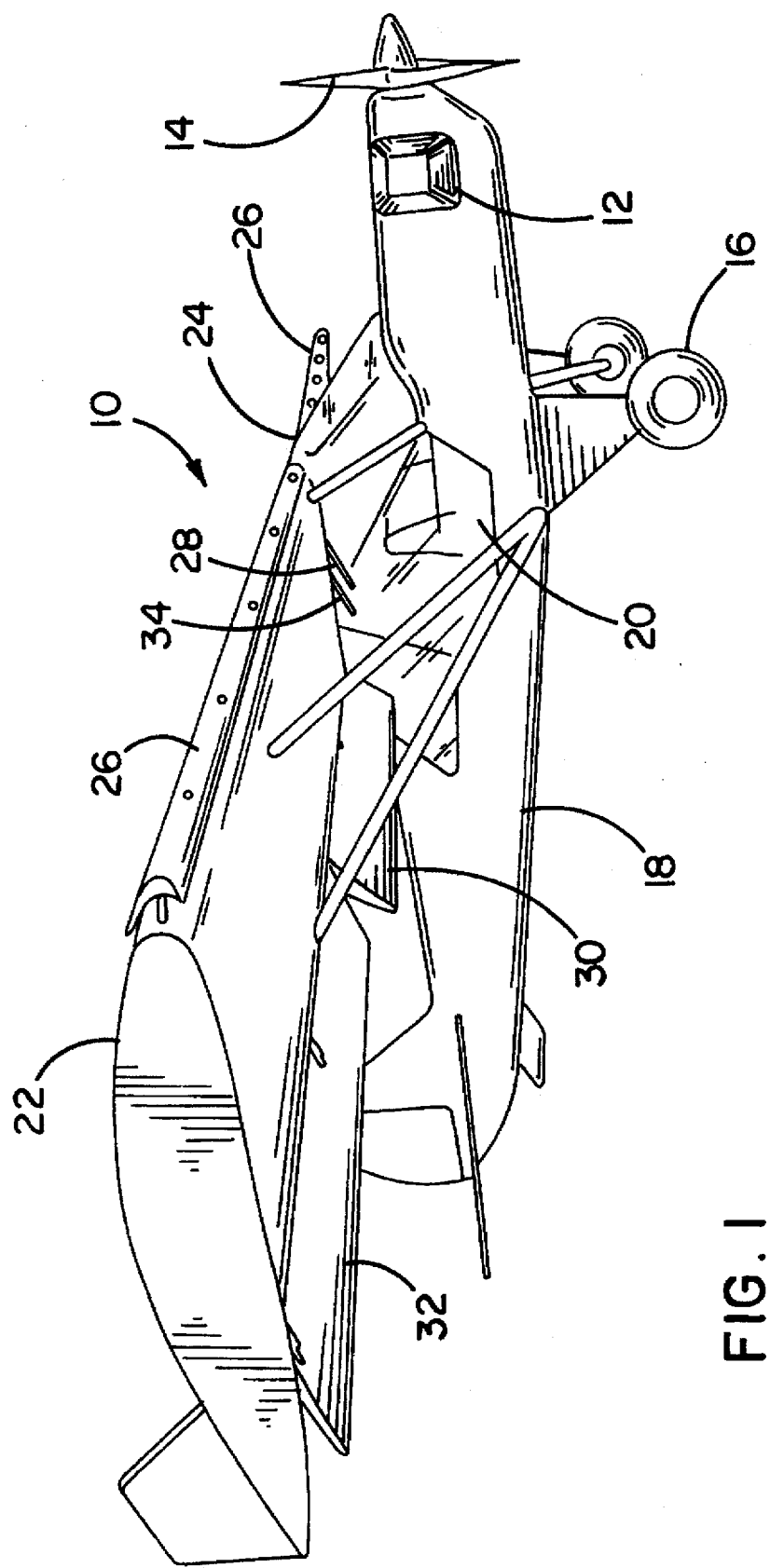
FIG. 1 is a perspective view of a STOL aircraft incorporating an aileron/flap mixing mechanism embodying various features of the invention.
Figure 2:
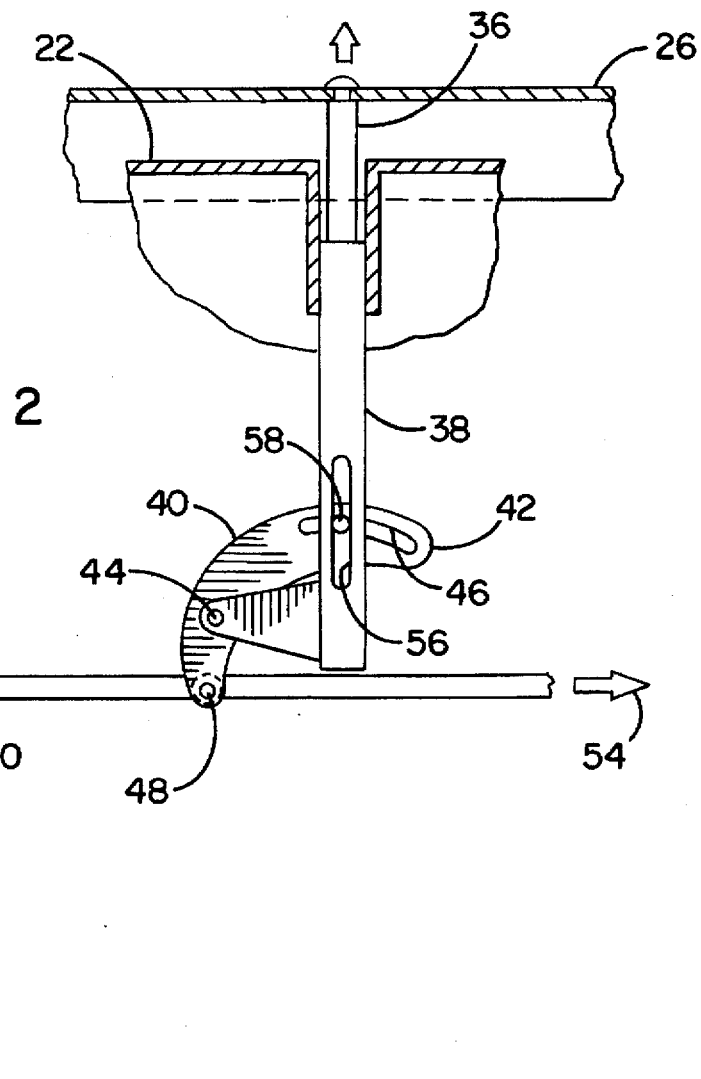
FIG. 2 is a diagrammatic view of an actuating mechanism for extending and retracting wing slats located along the leading edge of the wing of the aircraft shown in FIG. 1.
Figure 3:
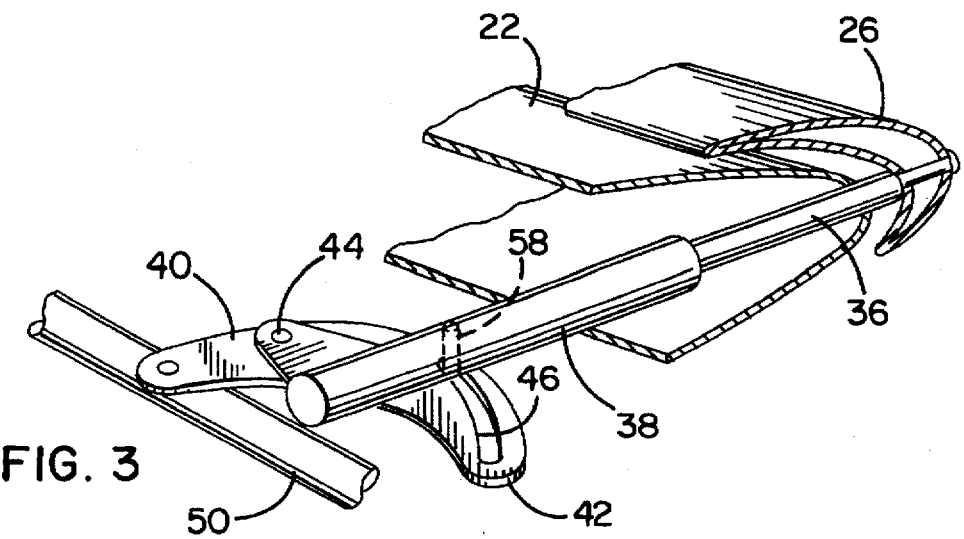
FIG. 3 is a perspective view of a bellcrank arrangement incorporated in the wing slat actuating mechanism shown in FIG. 2.

Referring to the drawings, and, in particular, to FIG. 1, a STOL aircraft 10 embodying various features of the invention is illustrated. In the illustrated embodiment, the aircraft 10 is of single, high wing configuration and is powered by a single, piston-type engine 12 turning a propeller 14. The aircraft 10 includes a fixed landing gear 16 of the tailwheel type. The aircraft 10 further includes a fuselage 18 having a cockpit 20 for seating the pilot and, if desired, a passenger. The wing includes a right wing 22 and a left wing 24 extending, respectively, to the right and to the left of the fuselage 18.

The aircraft 10 is configured for optimum STOL performance. To this end, the wing is provided with extendible leading edge slats 26. The slats 26 are mounted adjacent the leading edges of the right and left wings 22, 24. During slow flight or when maximum wing lift is desired, the slats 26 extend forwardly out from the leading edge to the position shown in FIG. 1. During cruising flight when maximum wing lift is neither necessary nor desired, the slats 26 are retracted rearwardly against the leading edge.

The extension and retraction of the slats 26 is controlled by the pilot by means of a pilot-actuated slat control handle 28 accessible from the cockpit 20. In the illustrated embodiment, the pilot-actuated slat control handle 28 for extending and retracting the wing slats 26 extends downwardly from the overhead in the cockpit 20. In the illustrated embodiment, the wing slats 26 are extended by pulling the slat control handle 28 down and forwardly. In cruising flight, when it is desired that the slats 26 be retracted, the control handle 28 is pulled up and backwardly out of the way where it is less likely to interfere with the pilot.

As further illustrated in FIG. 1, the aircraft 10 is provided with both flaps 30 and ailerons 32 along the trailing edge of each wing 22, 24. The flaps 30 are positioned adjacent the root of each wing 22, 24 near the fuselage 18. The ailerons 32 are located outboard of the flaps 30 adjacent the wing tips. The flaps 30 and ailerons 32 together occupy substantially the entire length of the trailing edge of the wing. In accordance with conventional practice, the flaps 30 are hinged to the wing for downwardly depending movement between a raised position, wherein each flap is aligned substantially with the chord of the wing, and a lowered position wherein each flap extends below the wing chord. Neither flap 30 is configured to rise substantially (e.g., more than 5 degrees) above the wing chord and the flaps 30 move only in unison, that is, the flaps on the right and left wings 22, 24 can only be lowered and raised together. It is neither possible nor desired to lower one flap while retracting the other or vice versa.

In further accordance with conventional practice, the ailerons 32 are configured to pivot both above and below the wing chord. Furthermore, unlike the flaps 30, which move in unison, the ailerons 32 move opposite one another. That is, when the fight aileron moves down, the left aileron moves up and vice versa. This enables the pilot to maintain control over the bank and roll of the aircraft 10.

The flaps 30 are moved between the retracted and lowered positions by means of a pilot-actuated flap control handle 34 accessible from the cockpit 20. In the illustrated embodiment, the flap control handle 34 is located adjacent the slat control handle 28 and is configured so that the flaps 30 are raised when the handle 34 is pulled back and up toward the cockpit overhead. When the flap control handle 34 is pulled down and forward, the flaps 30 are lowered.

To further improve STOL performance, the aircraft 10, in accordance with one aspect of the invention, further includes a flap/aileron mixing mechanism that functions to droop the ailerons 32 in unison relative to the wing chord when the flaps 30 are lowered. In other words, when the flaps 30 are deployed from the retracted position, both ailerons 32 are lowered or drooped relative to the wing as shown in FIG. 1. Although drooped, the ailerons 32 nevertheless remain moveable in opposite directions under the pilot's control in order to provide control over bank and roll. To maintain such control, and in accordance with another aspect of the invention, the ailerons 32 and flaps 30 are preferably drooped at different rates. In particular, the ailerons 32 droop by approximately one-half the angle by which the flaps 30 are lowered relative to the wing chord. In the illustrated embodiment, the flaps 30 can be lowered by increments to a maximum flap angle of approximately 45° relative to the wing chord. As the flaps 30 are lowered, the ailerons 32 are progressively drooped by an angle of approximately one-half the flap angle up to a maximum aileron droop of approximately 22°.

The combination of manually extendible slats 26 and ailerons 32 that droop with the flaps 30 substantially increases wing lift at low airspeeds and thereby substantially reduces the minimum controllable airspeed of the aircraft 10. This, in turn, improves the STOL performance of the aircraft 10 and makes the aircraft 10 well suited for applications wherein short takeoff and landing requirements are encountered, or wherein the application (e.g., observation, aerial inspection, etc.) requires flight at minimal airspeeds. Because the slats 26, flaps 30 and ailerons 32 can all be retracted and/or returned to an undeflected position when desired, improved STOL performance and the capability for flight at reduced airspeeds can be achieved without significantly reducing the cruising airspeed of the aircraft 10.

A preferred system for actuating the wing slats under the manual control of the pilot is illustrated in FIGS. 1–4. As shown, each slat 26 is mounted to a plurality of support members 36 that project perpendicularly forwardly from the leading edge of the wing 22, 24 and engage the slat 26. The support members, in turn, slidably engage a plurality of guide members 38 disposed along the leading edge of the wing. In the illustrated embodiment, the support member 36 and the guide member 38 comprise telescoping tubes. The outer relatively stationary tube 38 is mounted within the wing and the inner, relatively moveable tube 36 engages and supports the slat 26. Outward telescoping movement of the tubes 36, 38 causes the slat 26 to be extended, and inward telescoping movement of the tubes causes the slat to be retracted. Relative telescoping movement of the tubes 36, 38 is controlled by means of a control linkage. In particular, an arcuate bellcrank 40 having an outer end 42 is positioned adjacent the inward end of each pair of telescoping tubes 36, 38 for movement around a pivot 44. The outer end 42 of the bellcrank 40 includes an elongate arcuate slot 46 that overlaps the ends of the tubes 36, 38. The other end 48 of the bellcrank 40 is coupled through a control rod 50 and linkage to the slat control handle 28. Forward movement of the slat control handle 28 in the direction indicated by the arrow 52 causes the control rod 50 to move in the direction of the arrow 54. This, in turn, causes the bellcrank 40 to pivot in the counter-clockwise direction as viewed in FIGS. 2, 3 and 4.

Figure 4:
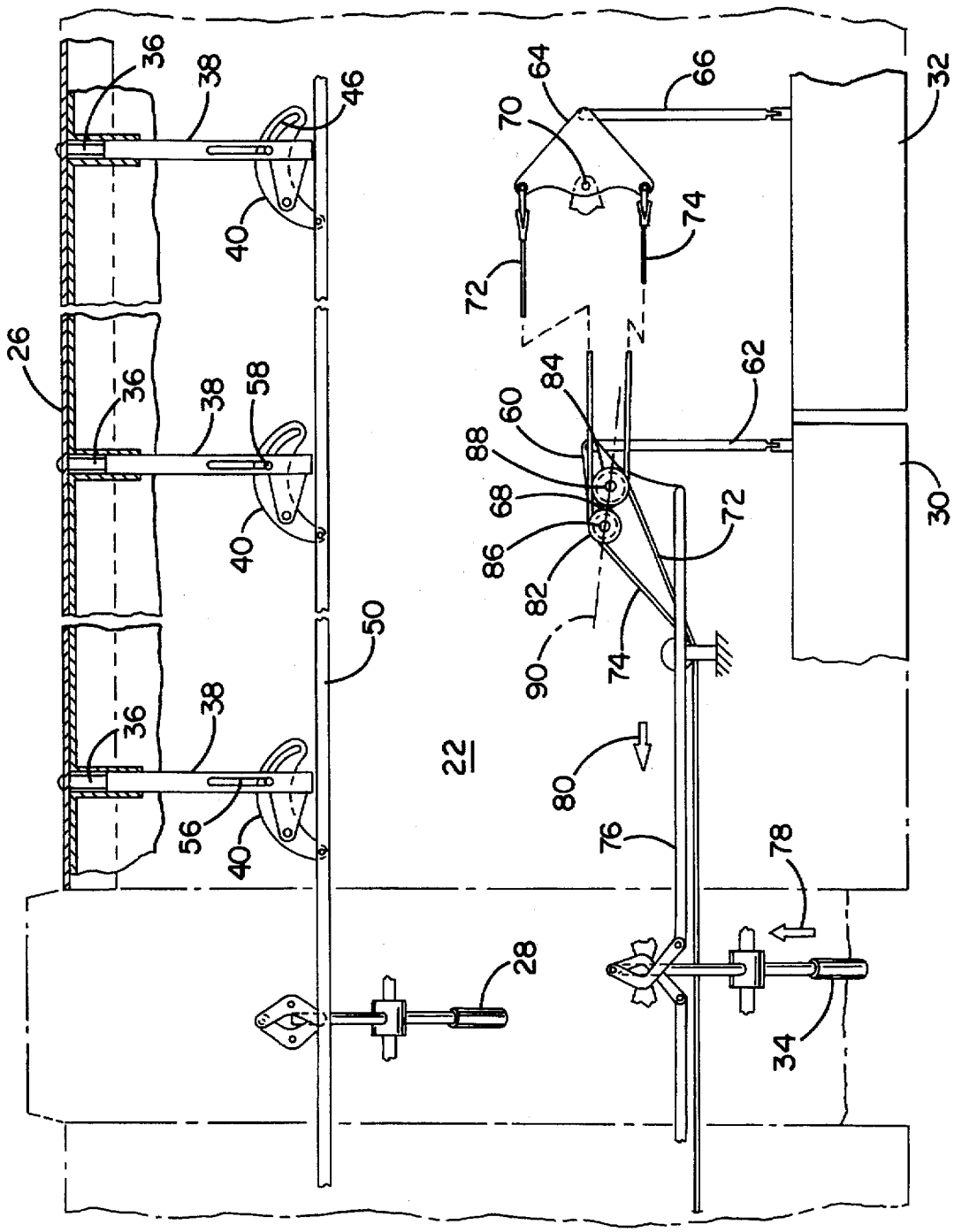
FIG. 4 is a fragmentary top plan view of the right wing of the aircraft shown in FIG. 1 useful in understanding the construction and operation of the wing slat actuating mechanism shown in FIGS. 2 and 3 and the aileron/flap mixing mechanism embodying various features of the invention.

As further illustrated, the outer tube 38 is provided with an elongate slot 56 that extends axially along the tube 38. The inner tube 36 includes an outwardly projecting pin 58 that extends through the elongate slot 56 and engages the arcuate slot 46 of the bellcrank 40. As the bellcrank 40 pivots, the arcuate slot 46 forces or cams the pin 58 forwardly along the elongate slot 56 causing the inner tube 36 to extend outwardly from the outer tube 38 and thereby extend the slat 26. When the slat control handle 28 is pulled in the opposite direction, the bellcrank 40 pivots in the clockwise direction causing the arcuate slot 46 to pull or cam the pin 58 in the opposite direction, thereby pulling the inner tube 36 inwardly relative to the outer tube 38 and retracting the slat 26 inwardly against the wing leading edge. As best seen in FIG. 4, a plurality of outer tubes 38, inner tubes 36 and bellcranks 40 are provided along the wing leading edge and are linked together by a single slat control rod 50 coupled to the slat control handle 28.

Figure 5:
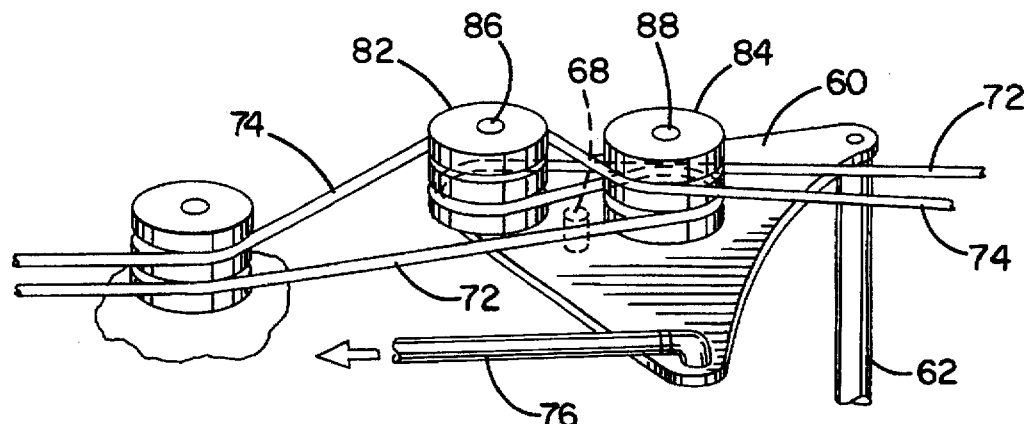
FIG. 5 is a fragmentary perspective view of a flap bellcrank constructed in accordance with various features of the invention useful in understanding the construction and operation of the aileron/flap mixing mechanism.
Figure 6:
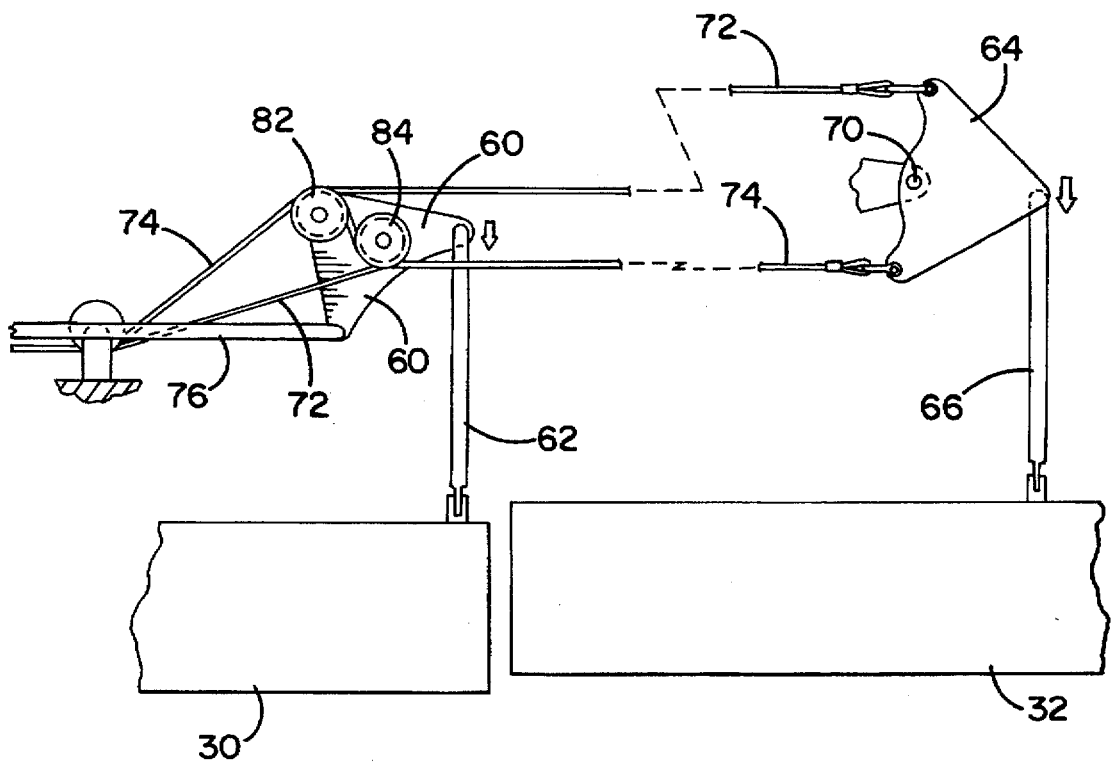
FIG. 6 is a diagrammatic plan view useful in understanding the operation of the aileron/flap mixing mechanism.

A preferred aileron/flap mixing system for drooping the ailerons when the flaps are lowered is shown in detail in FIGS. 4, 5 and 6. Referring to FIG. 4, the aileron/flap mixing system includes a first or flap bellcrank 60 that is coupled to the flap 30 through a push rod 62 and a second or aileron bellcrank 64 that is coupled to the aileron 32 through a push rod 62. The flap bellcrank 60 is mounted for rotation around a pivot 68, and the aileron bellcrank 64 is mounted for rotation around a pivot 70. In the illustrated embodiment, when the flap bellcrank 60 rotates in the clockwise direction, the push rod 62 extends toward the flap 30 thereby deploying the flap 30 to a lowered position. The angle to which the flap 30 is lowered is determined by the extent to which the flap bellcrank 60 is rotated around the pivot 68 in the clockwise direction. Similarly, when the aileron bellcrank 64 is rotated in a clockwise direction around the pivot 70, the push rod 66 extends toward the aileron 32 to lower the aileron 32 relative to the wing. When the bellcrank 64 rotates in the opposite or counter-clockwise direction, the push rod 66 pulls the aileron 32 to a raised position relative to the wing.

The rotational position of the aileron bellcrank 64 is controlled by a pair of aileron cables 72, 74 that are coupled to the aircraft's control stick or yoke (not shown). The cables 72, 74 are arranged in known manner to move in opposite directions in response to appropriate movement of the stick or yoke. This has the effect of rotating the aileron bellcrank 68 in either direction to raise or lower the aileron 32 relative to the wing.

The rotational position of the flap bellcrank 60 is controlled by means of a flap control rod 76 that is coupled through a linkage to the flap control handle 34. When the handle 34 is pulled forwardly in the direction of the arrow 78 shown in FIG. 4, the flap control rod 76 moves in the direction of the arrow 80. This pivots the flap bellcrank 60 in the clockwise direction to lower the flap 30. Similarly, pulling the control handle back pushes the flap control rod 76 in the opposite direction to rotate the flap bellcrank 60 in the counter-clockwise direction and thereby raise the flap 30.

In accordance with one aspect of the invention, a mixing control interface, coupled to the flap bellcrank 60, is provided for engaging the aileron control cables 72, 74 to vary the position of the cables relative to each other when the flaps 30 are deployed and thereby rotate the aileron bellcrank 64 to lower the ailerons 32 while simultaneously maintaining independent aileron control. In the illustrated embodiment, the mixing control interface includes a pair of pulleys 82, 84 that are mounted for rotation on the flap bellcrank 60. The control cables 72, 74 are threaded around and between the pulleys 82, 84 as illustrated. Preferably, each pulley 82, 84 includes a pair of sheaves for engaging the two control cables 72, 74. As further illustrated, the pulleys 82, 84 are each rotatable around an axis of rotation, 86, 88 and the pulleys are positioned on the flap bellcrank 60 so that the axes of rotation 86, 88 are centered on a line 90 extending through the flap bellcrank pivot 68. As further illustrated, the axes of rotation 86, 88 are substantially equidistant from the flap bellcrank pivot 68 and the line 90 they define preferably slopes toward the outer rear of the wing and forms a slight acute angle (approximately 5°) relative to the center line of the wing. When the pulleys 82, 84 are so located and mounted, and when the aileron control cables 72, 74 are so threaded, the length of the path of each cable 72, 74 from the control stick or yoke to the aileron bellcrank 64 depends on the rotational position of the flap bellcrank 60 around its pivot. Furthermore, as the flap bellcrank 60 rotates around its pivot 68, the path of one cable will become longer while the path of the other cable will become shorter.

In the illustrated embodiment, rotation of the flap bellcrank 60 in the clockwise direction causes the path of the upper aileron control cable 72 to become longer while the path of the lower aileron control cable 74 becomes shorter. Assuming no movement of the control stick or yoke, such movement of the flap bellcrank 60 will change the positions of the aileron control cables 72, 74 relative to each other with the effect that the aileron bellcrank 64 rotates in the clockwise direction to lower the aileron 32. Nevertheless, the aileron control cables remain independently moveable under the control of the control stick or yoke so that the actual aileron position can nevertheless be varied by the control stick or yoke. The particular geometry determines the rate at which the ailerons 32 droop as the flaps 30 are lowered. In general, the farther the pulleys 82, 84 are spaced from the pivot 68, the greater the ailerons will droop given any particular rotation of the flap bellcrank 60. In addition, the slight acute angle formed by line 90 and the centerline of the wing, in addition to providing clearance for the cables 72, 74, provides "lost motion" that eliminates or minimizes initial aileron droop as the flaps are initially lowered.

It will be appreciated that the right wing 22 and the left wing 24 are each equipped with slat actuating, flap actuating and aileron control systems of the type shown in FIG. 4. The slat control handle 28 controls the slat actuating systems of both wings 22, 24, and the flap control handle 34 controls the flap position and aileron droop of both wings 22, 24.

It will be appreciated that the slat actuating and aileron/flap mixing mechanisms can be utilized in aircraft having configurations different from that herein shown and described. For example, the mechanisms can be used on aircraft having high wing, low wing or mid-wing configurations. Furthermore, the actual shape of the wing is not limiting. In addition, the type and number of engines is not critical. Finally, while particular preferred systems for actuating the slats and drooping the ailerons have been shown and described, it will be appreciated that other systems and mechanisms can be formulated and used to achieve these functions and that such other systems are intended to be within the scope of the invention in its broader aspects.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A system for drooping the ailerons of an aircraft when the flaps of the aircraft are lowered, said system comprising:

a pilot actuated flap control including a flap bellcrank for lowering the flaps of the aircraft;

a pilot actuated aileron control including an aileron bellcrank and a pair of aileron control cables coupled thereto for varying the positions of the ailerons to control the roll and bank of the aircraft; and a mixing interface including a pair of pulley devices mounted for rotation on said flap bellcrank wherein said pair of control cables are threaded around and between said pulley devices and operative between said flap control and said aileron control to simultaneously droop the ailerons of the aircraft in response to pilot inputs to said flap control to lower the flaps while permitting said aileron control to vary the positions of the ailerons relative to each other thereby to maintain pilot control over aircraft bank and roll.

2. A system as defined in claim 1 wherein said flap bellcrank is mounted for rotation around a pivot and said pulleys are mounted on said flap bellcrank for rotation around two points located along a straight line extending through said pivot.

3. A system as defined in claim 2 wherein said two points lie on opposite sides of said pivot.

4. A system as defined in claim 3 wherein said two points are substantially equidistant from said pivot.

5. A system as defined in claim 4 wherein said flap bellcrank is mounted within the wing of the aircraft and said straight line sweeps back and away from the longitudinal axis of the aircraft.

6. A system as defined in claim 5 wherein each of said pulleys includes two sheaves for engaging, separately, said aileron control cables.

7. A system as defined in claim 1 wherein said mixing interface functions to droop the ailerons by an amount less than the amount by which the flaps are lowered.

8. A system as defined in claim 7 wherein said mixing interface functions to droop the ailerons by substantially one-half the angle to which the flaps are lowered.

9. A system as defined in claim 8 wherein said mixing interface provides lost motion so that incremental aileron droop is less when the flaps are near their retracted position than when the flaps are near their fully lowered position.

10. A system for drooping the ailerons of an aircraft when the flaps of the aircraft are lowered, said control system comprising:

an aileron bellcrank coupled to one of the ailerons and operable to lower the aileron in response to rotation of said aileron bellcrank in a first direction and to raise the aileron in response to rotation of said aileron bellcrank in a second direction;

a pair of aileron control cables coupled to said aileron bellcrank for rotating said aileron bellcrank to raise and lower the aileron;

a flap bellcrank coupled to the flap and operable to lower the flap in response to rotation of said flap from a predetermined initial position and to raise the flap in response to rotation of said flap bellcrank back to said initial position;

a control link coupled to said flap bellcrank for rotating said flap bellcrank from and to said initial position to lower and raise the flap; and a mixing control interface including a pair of pulley devices mounted on said flap bellcrank and engaging said aileron control cables for varying the position of said aileron control cables relative to each other in response to rotation of said flap bellcrank to rotate said aileron bellcrank in said first direction when said flap bellcrank is rotated from said initial position so that the aileron is drooped when the flap is lowered and so that said aileron control cables remain operative to raise and lower the aileron even though the aileron is drooped.

11. A system as defined in claim 10 wherein each of the aileron control cables is threaded around and between said pulleys so that said pulleys engage each of the aileron control cables.

12. A system as defined in claim 11 wherein said flap bellcrank is mounted for pivoting movement around a pivot and wherein said pulleys are positioned substantially along a line defined by said pivot and the central axes of rotation of said pulleys.

13. A system as defined in claim 12 wherein said pulleys are positioned on opposite sides of said pivot.

14. A system as defined in claim 13 wherein said pulleys are spaced substantially equidistant from said pivot.

* * * * *